US009357386B2

(12) United States Patent
McCann et al.

(10) Patent No.: US 9,357,386 B2
(45) Date of Patent: May 31, 2016

(54) SYSTEM AND METHOD FOR FEMTO ID VERIFICATION

(71) Applicant: FutureWei Technologies, Inc., Plano, TX (US)

(72) Inventors: Peter J. McCann, Somerset, NJ (US); Marcus Wong, Green Brook, NJ (US)

(73) Assignee: Futurewei Technologies, Inc., Plano, TX (US)

(*) Notice: Subject to any disclaimer, the term of this patent is extended or adjusted under 35 U.S.C. 154(b) by 279 days.

(21) Appl. No.: 13/922,797

(22) Filed: Jun. 20, 2013

(65) Prior Publication Data

US 2014/0004830 A1 Jan. 2, 2014

Related U.S. Application Data

(60) Provisional application No. 61/666,551, filed on Jun. 29, 2012.

(51) Int. Cl.
*H04M 1/66* (2006.01)
*H04W 12/06* (2009.01)
*H04L 29/12* (2006.01)
*H04L 29/06* (2006.01)

(52) U.S. Cl.
CPC ........... *H04W 12/06* (2013.01); *H04L 61/2076* (2013.01); *H04L 61/1511* (2013.01); *H04L 63/164* (2013.01)

(58) Field of Classification Search
None
See application file for complete search history.

(56) References Cited

U.S. PATENT DOCUMENTS

| 2011/0237258 | A1 | 9/2011 | Nylander et al. | |
| 2012/0069737 | A1* | 3/2012 | Vikberg et al. | H04W 28/12 370/232 |

FOREIGN PATENT DOCUMENTS

| CN | 101867928 A | 10/2010 |
| WO | 2009136844 A1 | 11/2009 |
| WO | WO2011053216 | * 5/2011 |

OTHER PUBLICATIONS

3rd Generation Partnership Project; Technical Specfication Group Services and System Aspects; Security of Home Node B (HNB) / Home evolved Node B (HeNB) (Release 9)—3GPP TS 33.320 V9.4.0, Dec. 2010, 34 pages.*
Kaufman, C., et al., "Internet Key Exhange Protocol Verions 2 (IKEv2)" Internet Engineering Task Force (IETF), Sep. 2010, pp. 1-139.

(Continued)

*Primary Examiner* — Suhail Khan
(74) *Attorney, Agent, or Firm* — Futurewei Technologies, Inc.

(57) ABSTRACT

Embodiments are provided for enabling identity verification of messages originating from a radio station, such as a Femto cell, to a gateway, such as a Femto gateway. In an embodiment, a radio station establishes a first connection for authentication with a security gateway, sends authentication information on the first connection, and receives in return an Internet Protocol (IP) address assigned to the radio station. The security gateway updates a Domain Name System (DNS) to map between the IP address and a DNS name for the radio station. The radio station also establishes a second connection for control messages with a second gateway, and sends the IP address and an identity of the radio station on the second connection. The mapping between the IP address and the DNS name enables the second gateway to identify messages on the second connection between the radio station and the second gateway.

16 Claims, 2 Drawing Sheets

(56) References Cited

OTHER PUBLICATIONS

"$3^{rd}$ Generation Partnership Project; Technical Specification Group Services and System Aspects; Security of Home Node B (HNB)/ home evolved Node B (HeNB) (Release 11)," Technical Specification, 3GPP TS 33.320, V11.6.0, Jun. 2012, 41 pages.

"$3^{rd}$ Generation Partnership Project; Technical Specification Group Services and System Aspects; Architecture aspects of Home NodeB and Home eNodeB (Release 9)," Technical Specification, 3GPP TR 23.830, V9.0.0, Sep. 2009, 55 pages.

Huawei, et al., "H(e)Nb message verification solution and analysis," 3GPP TSG SA WG3 (Security) Meeting #68, S3-120640, Agenda Item: 7.8 H(e)NB, Jul. 9-13, 2012, pp. 1-2.

"3rd Generation Partnership Project; Technical Specification Group Services and System Aspects; Security of Home Node B (HNB) /Home evolved Node B (HeNB) (Release 11)," 3GPP TS 33.320, V11.6.0, Jun. 2012, 41 pages.

"3rd Generation Partnership Project; Technical Specification Group Radio Access Network; UTRAN architecture for 3G Home Node B (HNB); Stage 2 (Release 11)," 3GPP TS 25.467, V11.1.0, Dec. 2012, 80 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.4.0, Dec. 2012, 208 pages.

"Notification of Transmittal of the International Search Report and the Written Opinion of the International Searching Authority, or the Declaration," International Application No. PCT/CN2013/078593, Applicant: Huawei Technologies Co., Ltd., mailing date: Oct. 10, 2013, 11 pages.

\* cited by examiner

SYSTEM AND METHOD FOR FEMTO ID VERIFICATION

This application claims the benefit of U.S. Provisional Application No. 61/666,551 filed on Jun. 29, 2012 by Peter McCann and entitled "System and Method for Femto ID verification," which is hereby incorporated herein by reference as if reproduced in its entirety.

TECHNICAL FIELD

The present invention relates to the field of wireless communications, and, in particular embodiments, to a system and method for Femto ID verification.

BACKGROUND

In 3GPP Femto deployment, a user device communicates with a Femto cell, e.g., via a wireless link, to gain access to the Internet or other access networks. The Femto cell is a small, low-power cellular base station, typically designed for use in a home or small business, that connects to the service provider's network via broadband (such as DSL or cable). For example, a Femto cell can support two to four active mobile phones in a residential setting, and eight to 16 active mobile phones in enterprise settings. A Femto cell allows service providers to extend service coverage indoors or at the cell edge, such as where access would otherwise be limited or unavailable. Wireless communication standards, such as CDMA, GSM, or LTE can be supported. In some scenarios, the Femto cell communicates with a gateway (referred to sometimes as a Femto gateway) to access the service provider's network. The gateway may provide different access functionalities including security. Increasing security access between the Femto cell and the Femto gateway further improves network security and protects user communications.

SUMMARY OF THE INVENTION

In accordance with an embodiment, a method for supporting identity verification in messages from a radio station to a gateway includes establishing, at a radio station, a first connection for authentication with a security gateway. The radio station then sends client certificate information on the first connection to the security gateway and receives in return an Internet Protocol (IP) address associated with the client certificate information. The radio station also establishes a second connection for control messages with a second gateway, and sends the IP address and an identity (ID) of the radio station on the second connection to the second gateway. The ID and IP address enable the second gateway to identify the radio station.

In accordance with another embodiment, a network component for supporting identity verification in messages from a radio station to a gateway includes at least one processor and a computer readable storage medium storing programming for execution by the at least one processor. The programming includes instructions to establish an Internet Protocol Security (IPsec) connection for authentication with a security gateway, send client certificate information on the IPsec connection to the security gateway, and receive an Internet Protocol (IP) address assigned by the security gateway in association with the client certificate information. The network component is also configured to establish a S1 connection for control messages with a second gateway and send the IP address and an identity (ID) of the network component on the S1 connection. The ID and IP address enable the second gateway to identify the radio station.

In accordance with an embodiment, a method for enabling identity verification in messages from a radio station to a gateway includes establishing, at a security gateway, an Internet Protocol Security (IPsec) connection for authentication with a radio station, and receiving, at the security gateway, client certificate information on the IPsec connection from the radio station. The security gateway then assigns an Internet Protocol (IP) address for the radio station and sends to a Domain Name System (DNS) an update for mapping between the IP address and a DNS name derived from a Subject Alternative Name (SAN) for the radio station. The mapping between the IP address and the derived DNS name enables a second gateway to identify messages on a S1 connection between the radio station and the second gateway.

In accordance with another embodiment, a network component for enabling identity verification in messages from a radio station to a gateway includes at least one processor and a computer readable storage medium storing programming for execution by the at least one processor. The programming including instructions to establish an Internet Protocol Security (IPsec) connection for authentication with a Femto cell, receive client certificate information on the IPsec connection from the Femto cell, and assign an Internet Protocol (IP) address for the Femto cell. The network component is further configured to update a mapping between the IP address and a Subject Alternative Name (SAN) for the Femto cell at a Domain Name System (DNS). The mapping between the IP address and the SAN enables a Femto gateway to identify messages on a S1 connection between the Femto cell and the Femto gateway.

In accordance with another embodiment, a method for identity verification in messages from a radio station to a gateway includes establishing, at a gateway, a first connection for control messages with a radio station, and receiving a first Internet Protocol (IP) address and an identity (ID) of the radio station on the first connection. The gateway then looks up the ID at a Domain Name System (DNS), and receives in return from the DNS a second IP address mapped to the ID. The mapping of the second IP address to the ID is previously added according to a DNS update from a security gateway that authenticated the radio station via a second connection. The gateway then verifies whether the second IP address from the DNS matches the first IP address from the radio station.

In accordance with yet another embodiment, a network component for identity verification in messages from a radio station to a gateway includes at least one processor and a computer readable storage medium storing programming for execution by the at least one processor. The programming includes instructions to establish a S1 connection for control messages with a Femto cell, receive a first Internet Protocol (IP) address and a Femto cell identity (ID) on the S1 connection, and look up the Femto cell ID at a Domain Name System (DNS). IN return, the network component receives from the DNS a second IP address mapped to the Femto cell ID. The mapping of the IP address to the Femto cell ID is previously added according to a DNS update from a security gateway that authenticated the Femto cell via an Internet Protocol Security (IPsec) connection. The network component then verifies whether the second IP address from the DNS matches the first IP address from the Femto cell.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
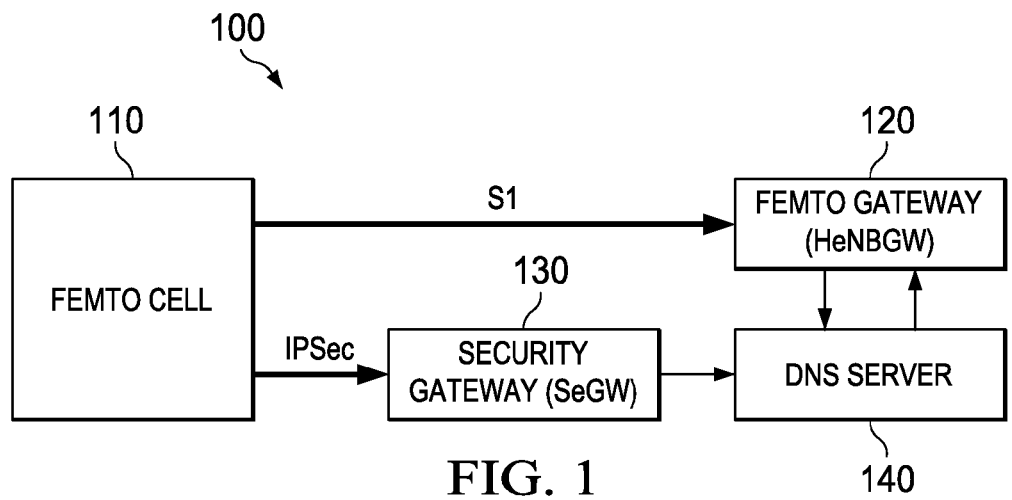
FIG. 1 illustrates an embodiment scheme for enabling the verification of identity of messages from a Femto cell to a Femto gateway in a Femto deployment or similar deployments.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In 3GPP compliant Femto deployment, messages exchanged between a Femto cell and Femto gateway on the S1 interface are typically encapsulated in an Internet Protocol Security (IPsec) tunnel between the Femto cell and a Security gateway. The security gateway decapsulates or removes encapsulation from the messages without any verification of the content before passing the messages onto the destination, e.g., a Femto gateway. However, if a Femto cell is compromised, an attacker may substitute the identities presented in the messages for the Femto gateway with that of another Femto cell, potentially bypassing certain security features of the Femto gateway, such as access control. The security gateway has no means of verifying the identity of messages from Femto cell to Femto gateway since the secure gateway does not check the content within the IPsec tunnel. Further, the Femto gateway has no means of verifying whether the identities presented in the messages from the Femto cell belongs to the Femto cell that has established the IPsec tunnel between the Femto cell and the Security gateway since the Femto gateway has no information mapping the Femto cell identity to that of the Femto cell IPsec Internet Protocol (IP) address which was assigned by the security gateway. There is a need for a mechanism that enables the verification of identity of messages sent from a Femto cell to a Femto gateway in a Femto deployment or similar deployments. For instance, this verification is important in case that the Femto cell's access control is set to a "closed mode access". "Closed mode access" is when the Femto cell is configured to allow only a set of specific mobiles in a closed subscriber group to access the operator's network via the Femto cell. Such mechanism would increase security in deployment and prevents or limits unauthenticated access or attacks on gateways or Femto cells.

Currently, 3GPP working group SA3 has defined a requirement to verify that identities in all S1 messages from a Femto cell to a Femto gateway are the true identity of the Femto cell that originated the S1 message and not a spoofed identity belonging to another Femto cell (or entity). Embodiments are provided herein for enabling the verification of identity of messages originating from a Femto cell to a Femto gateway in a Femto deployment. The embodiments may also be implemented in other suitable deployments or networks that involve similar exchanges or communications between base stations (or radio nodes) and gateways. The embodiments improve security of the network by preventing attacks on the gateways or Femto cells which take advantage of assuming identities of legitimate Femto cells that have been authenticated (or other stations).

The embodiments include a method for a Femto gateway to verify the identity of a Femto cell (in communications with the Femto gateway) using Domain Name System (DNS) features, which may be commonly found in a typical Femto cell deployment. A designated security gateway can update a DNS server to maintain a mapping of the identity of the Femto cell to an IP address. The IP address can be assigned by the security gateway to the Femto cell during an IPsec tunnel establishment between the Femto cell and the security gateway. Subsequently, when the Femto gateway receives a message (e.g., a S1 message) from the Femto cell, the Femto gateway queries the DNS server to obtain the mapping of the Femto cell's identity and the Femto cell's IP address assigned by the security Gateway. The Femto gateway can use the DNS mapping to verify whether the identity of messages on the S1 interface from the Femto cell are indeed from a legitimate Femto cell and not of a spoofed identity (for a malicious attack on the Femto gateway). Details of this scheme are described below.

FIG. 1 illustrates an embodiment of a scheme 100 for enabling the verification of identity of messages originating from a Femto cell 110 to a Femto gateway 120. Specifically, the Femto cell 110 and the Femto gateway 120 are part of a Femto deployment. The Femto cell 110 may be a relatively low power cellular base station typically designed for use in a home or small business office, such as a Home eNB (HeNB). The Femto cell 110 allows user devices (not shown) to connect wirelessly (e.g., using cellular or other compatible communication technologies/standards) to a corresponding network for voice, video, and/or data communications. The Femto gateway 120 may be any network component (e.g., a network node, router, or switch) configured to allow the Femto cell 110 access a network (not shown) and to handle the forwarding or packets or messages between the Femto cell 110 and the network. For instance, the Femto gateway 120 is a Home eNB gateway (HeNBGW), placed at the home or office.

The Femto cell 110 connects to a secure gateway (SeGW) 130 using an IPsec tunnel (IPsec message encapsulation). The SeGW 130 may be any network component (e.g., network node or server) in charge of assigning unique IP addresses to Femto cells. The Femto cell 110 and the SeGW 120 can use an Internet Key Exchange (IKE or IKEv2) protocol to set up a security association (SA) in the IPsec connection. The SeGW 130 verifies client certificate information from the Femto cell 110 to authenticate the Femto cell 110 and thus assigns a unique Tunnel Inner Address (TIA) IP address for that Femto cell 110. Subsequently, the SeGW 130 sends an update to a DNS server 140 to update the DNS server 140 of the assigned TIA IP address of this corresponding Femto cell 110. The SeGW 130 maps the Subject Alternative Name (SAN) from the certificate used during IPsec tunnel establishment to a DNS name. In turn, the DNS server 140 maps the DNS name to the IP address assigned by the SeGW 130. The SeGW 130 may update the DNS of the assigned IP address, for each new or updated Femto cell 110, in a dynamic manner (e.g., in real-time) upon establishing the IPsec connection. The SeGW 130 and the DNS server 140 may be part of the same network or may communicate with each other over different networks.

After receiving the IP address from the SeGW 130, the Femto cell can connect to the Femto gateway 120 using a S1 interface (S1 protocol encapsulation) to exchange control or signaling messages. The S1 connection may be established over a Stream Control Transmission Protocol (SCTP), where a S1 setup request can be sent from the Femto cell 110 to the Femto gateway 120. The request includes an identity of the Femto cell 110, such as an HeNB ID, and the IP address assigned to the Femto cell 110 from the SeGW 130. Upon receiving the S1 setup request, the Femto gateway 120 can contact the DNS server 140 to verify that this identity (the HeNB ID) belongs to this Femto cell 110 originating the S1 setup request. If the IP address was pre-registered (or mapped previously) at the DNS server 140 (in response the SeGW's 130 DNS update), then the DNS server 140 informs the Femto gateway 120 that the identity is successfully authenticated. Alternatively, the DNS serve 140 returns the IP address of the mapping associated with that identity to the Femto Gateway 120. The Femto gateway 120 is then able to confirm that the IP address returned form the DNS server 140 matches the IP address in the S1 setup request, and hence authenticates the identity of the Femto cell 110. Upon this successful authentication, the Femto gateway 120 begins receiving S1 messages from the Femto cell 110. Otherwise, the Femto gateway 120 may block the connection upon detecting a false identity, e.g., a mismatch between the received identity and the IP address of the sender. Similarly, the Femto gateway 120 may monitor S1 messages over an established S1 connection after establishing the connection to verify that the identities in the messages correspond to Femto cell 110 authenticated by the SeGW 130.

To ensure that an assigned identity of a HeNB, which is referred to herein as a HeNB ID, is not spoofed by another HeNB (or an unauthorized entity) communicating with the Femto gateway (or HeNBGW), a mechanism is needed to associate the HeNB ID with a secure connection (IPsec) that took place to authenticate a HeNB with a SeGW. When the SeGW and HeNBGW are physically separate, a mechanism is needed to carry the association of the SAN (as given in the HeNB certificate) to the S1 connection being set up to carry control and signaling traffic. The scheme 100 above provides this mechanism by carrying a binding between the SAN and the HeNB's IP address assigned by the SeGW to the HeNB. Since it is (reasonably) difficult for a host to spoof a SCTP connection from an IP address that isn't routed to that connection, the scheme 100 can ensure that if the HeNBGW knows the IP address assigned to an authenticated HeNB, other HeNBs (which don't have access to the traffic sent to that IP address) are prevented from spoofing the connection when pretending to be the authenticated HeNB.

As described above, the binding is carried out using a DNS system, which already has support for binding names to addresses. The SeGW can update the DNS so that the DNS contains a mapping from the DNS name derived from the SAN to the IP address assigned to the HeNB. For instance, a VPN gateway can perform the dynamic DNS update of scheme 100, when clients connect to the VPN gateway. When the HeNBGW receives the S1 setup request message, it can derive a DNS name that corresponds to the HeNB ID presented to it, perform a DNS lookup (with the DNS server) on this DNS name, and verify that the IP address returned (from the DNS server) is the same one being used as the source of the SCTP connection over which the S1 setup request message is sent. The same verification procedure can be extended to other S1 messages originating from the HeNB. This scheme satisfies the HeNB message verification requirement in 3GPP SA3.

In an embodiment, the HeNBGW maintains a database that maps HeNB IDs to DNS names. Alternatively, a convention for naming the HeNBs may be used in the choice of SANs in certificates. For example, all HeNBs can use certificates with HeNB_ID.MNC.MCC.3gppnetwork.org in the SAN field. This would make it easy for the HeNBGW to associate an ID with a DNS name that would be used to lookup the inner IP address assigned by the SeGW and used to update the DNS server.

The mechanism provided above is compliant with mandatory features of the Femto cell and does not need new software on the Femto cell. Since current security gateways already perform dynamic DNS update, there may not be a need for new software on the security gateways. The DNS mapping from the Femto cell identity to the TIA IP address is performed whenever the IPsec is established between the Femto cell and the security gateway. Current Femto gateways may already implement the DNS protocol, and may need a minor change to perform DNS lookup upon receiving a S1 setup request. Upon receipt of the S1 setup request, the Femto gateway performs DNS lookup to verify that the presented identity owns the source IP address of the SCTP connection between the Femto cell and the Femto gateway.

In comparison to other solutions that may solve the problem of Femto cell identity verification using a complicated new protocol between the security gateway and the Femto gateway, an Authentication, Authorization and Accounting (AAA) server, and/or a Mobility Management Entity (MME), the solution of scheme 100 uses simpler DNS features and other readily available features/protocols.

Figure 2:
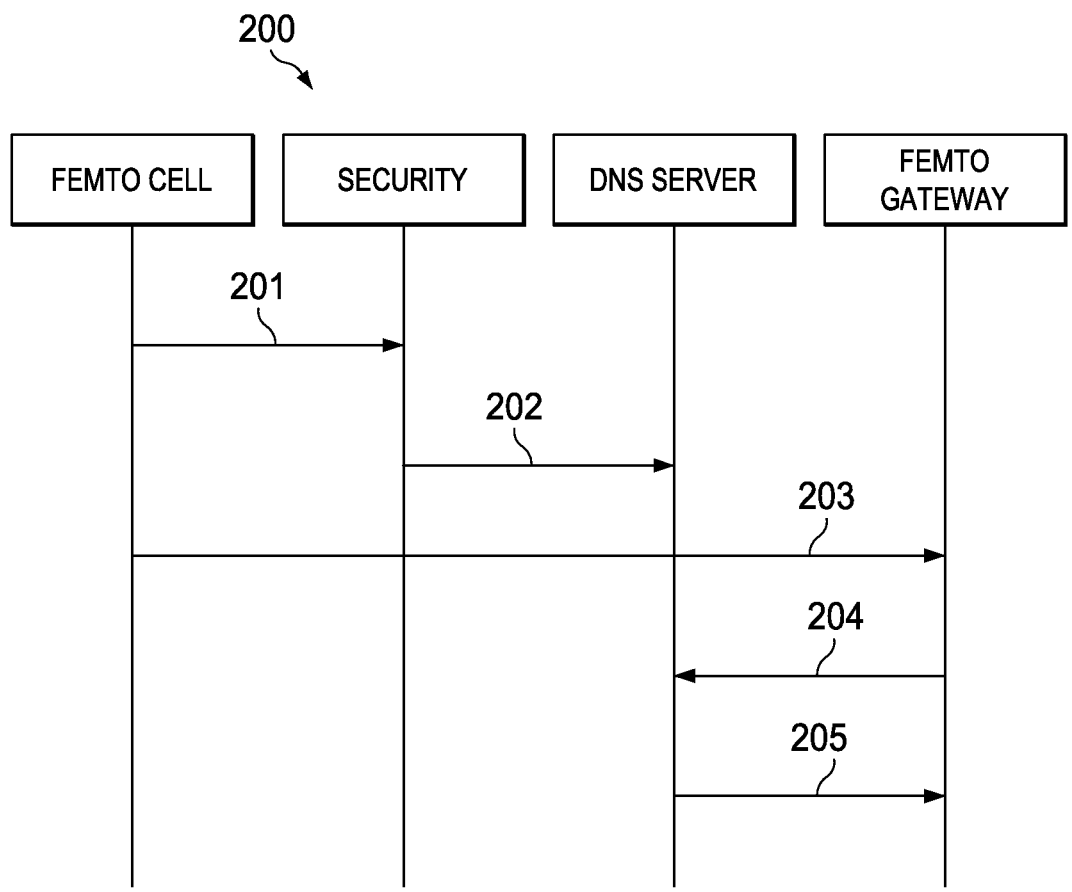
FIG. 2 illustrates a flowchart of an embodiment method for enabling the verification of identity of messages from a Femto cell to a Femto gateway in a Femto deployment or similar deployments.

FIG. 2 illustrates an embodiment of a method 100, for example as part of a protocol implementation, for enabling the verification of identity of messages originating from a Femto cell to a Femto gateway. For example, the method 100 is implemented between the components of the scheme 100. At step 201, a Femto cell establishes an IPsec connection with a security gateway, for instance using IKEv2. The security gateway receives from the Femto cell a client certificate and assigns a TIA IP address to the Femto cell. At step 202, the security gateway contacts a DNS server to update a mapping of a DNS name derived from the SAN to IP address of the Femto cell at the DNS server, e.g., in a mapping table or database for Femto cells. The DNS update for Femto cells by the security gateway is dynamic, e.g., implemented each time upon establishing an IPsec connection between a Femto cell and a security gateway. At step 203, the Femto cell establishes a S1 connection with a Femto gateway, for instance over SCTP. The Femto cell sends a S1 setup request to the Femto gateway. At step 204, the Femto gateway generates a DNS name for the Femto cell and looks up the Femto cell (using the indicated Femto cell identity or HeNB ID in the S1 setup request) in the DNS server. At step 205, the DNS server returns the IP address associated with the identity of the Femto cell according to the mapping information (database or table). The Femto cell can then verify whether the indicated IP address for that identity matches the IP address of the Femto cell in the S1 setup request, and allows the Femto cell access if the identity is verified.

In an embodiment, when the IPsec tunnel between a Femto cell and a security gateway is closed down, a process is implemented to remove the registration of (de-register) the IP address that was previously assigned by the security gateway to the Femto cell. The process includes sending from the security gateway a dynamic DNS update message to the DNS server to instruct the DNS server to remove the mapping of that IP address from the mapping table/database. Further, after closing down the IPsec tunnel, the security gateway may not re-assign the removed or de-registered IP address to a second Femto cell, for instance for a predefined duration of a DNS Time-To-Live (TTL) value that may be stored. This prevents a situation where a second Femto cell attempts to hijack a connection (S1 connection) using the same IP address that was previously assigned to the original (victim) Femto cell.

Figure 3:
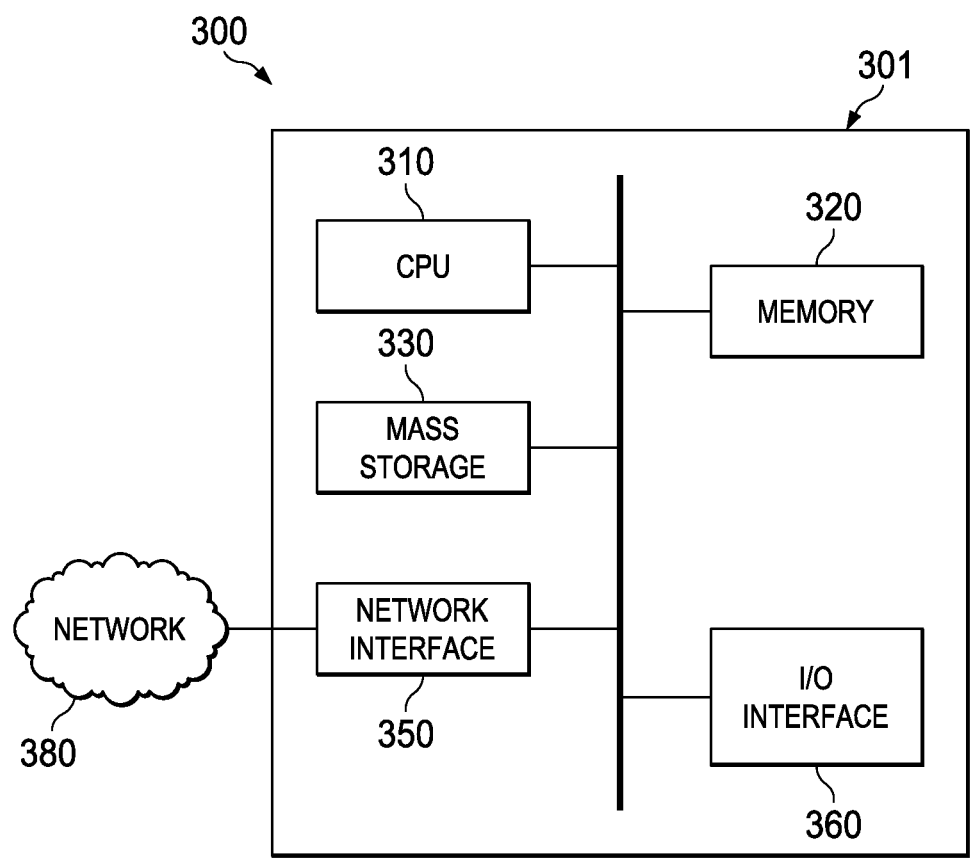
FIG. 3 is a diagram of a processing system that can be used to implement various embodiments.

FIG. 3 is a block diagram of an exemplary processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for supporting identity verification in messages from a radio station to a gateway, the method comprising:
    establishing, at a radio station, a first connection for authentication with a security gateway;
    sending, from the radio station, client certificate information on the first connection to the security gateway, wherein the security gateway maps an Internet Protocol (IP) address with the client certificate information and updates a system with a binding information of the IP address with the client certificate information;
    receiving the IP address at the radio station from the security gateway;
    establishing, at the radio station, a second connection with a second gateway; and
    sending, from the radio station, the IP address and an identity (ID) of the radio station on the second connection to the second gateway, wherein the second gateway identifies the radio station by obtaining the binding information from the system.

2. The method of claim 1, wherein the radio station is a Femto cell and the second gateway is a Femto gateway.

3. The method of claim 1, wherein the first connection is an Internet Protocol Security (IPsec) connection.

4. The method of claim 1, wherein authentication on the first connection is established using an Internet Key Exchange (IKE) protocol to set up a security association (SA) in the first connection.

5. The method of claim 1, wherein the second connection is a S1 connection.

6. The method of claim 1, wherein the ID of the radio station and the IP address are sent in a S1 setup request to the second gateway.

7. The method of claim 1, wherein the ID of the radio station and the IP address is sent in a S1 message subsequent to a S1 setup request to the second gateway.

8. The method of claim 1, wherein the second connection is established using a Stream Control Transmission Protocol (SCTP).

9. A radio station for supporting identity verification in messages from a radio station to a gateway, the radio station comprising:
    at least one processor; and
    a non-transitory computer readable storage medium storing computer executable instructions that when executed by the at least one processor instruct the processor to:

establish a first connection for authentication with a security gateway;

send client certificate information on the first connection to the security gateway, wherein the security gateway maps an Internet Protocol (IP) address with the client certificate information and updates a system with a binding information of the IP address with the client certificate information;

receive the IP address, from the security gateway;

establish a second connection with a second gateway; and send the IP address and an identity (ID) of the radio station on the second connection to the second gateway, wherein the second gateway identifies the radio station by obtaining the binding information from the system.

10. The radio station of claim 9, wherein the radio station is a Femto cell and the second gateway is a Femto gateway.

11. The radio station of claim 9, wherein the first connection is an Internet Protocol Security (IPsec) connection.

12. The radio station of claim 9, wherein the programming further includes instructions to establish authentication on the first connection using an Internet Key Exchange (IKE) protocol to set up a security association (SA) in the first connection.

13. The radio station of claim 9, wherein the second connection is a S1 connection.

14. The radio station of claim 9, wherein the programming further includes instructions to send the ID of the radio station and the IP address in a S1 setup request to the second gateway.

15. The radio station of claim 9, wherein the programming further includes instructions to send the ID of the radio station and the IP address in a S1 message subsequent to a S1 setup request to the second gateway.

16. The radio station of claim 9, wherein the programming further includes instructions to establish the second connection using a Stream Control Transmission Protocol (SCTP).

* * * * *